C. M. HAYNES.
REPAIR DEVICE FOR EYEGLASSES AND SPECTACLES.
APPLICATION FILED DEC. 9, 1911.

1,027,417.

Patented May 28, 1912.

Witnesses:
C. L. Belcher
Bert R. Graham

C. M. Haynes,
Inventor,
By his Attorney
Sturges S. Dunham

UNITED STATES PATENT OFFICE.

CHARLES M. HAYNES, OF CHILLICOTHE, OHIO.

REPAIR DEVICE FOR EYEGLASSES AND SPECTACLES.

1,027,417. Specification of Letters Patent. Patented May 28, 1912.

Application filed December 9, 1911. Serial No. 664,738.

*To all whom it may concern:*

Be it known that I, CHARLES M. HAYNES, a citizen of the United States, residing at Chillicothe, in the county of Ross and State of Ohio, have invented certain new and useful Improvements in Repair Devices for Eyeglasses and Spectacles, of which the following is a full, clear, and exact description.

As is well known, "rimless" eyeglasses and spectacles are subject to more or less frequent breakage, with considerable annoyance and inconvenience to the wearer, particularly in the case of specially ground lenses which the optician cannot replace instantly but which have to be made, or ordered from a distance. Modern high grade lenses are also costly, and hence expensive to replace. Need has therefore long been felt for some method of repairing lenses that are not actually shattered but exhibit only comparatively slight damage, and I have accordingly been led to devise my present invention, with that end in view.

The usual means for securing rimless lenses on the mounting is a forked post which straddles the edge of the lens and is firmly secured thereto by a screw or rivet extending through the lens; and it is at that point that the breakage of the lens most often occurs, producing a more or less V-shaped notch, terminating at the screw hole. This does not injure the lens for seeing purposes, but nevertheless the lens cannot be reattached to the mounting and hence a new lens must be procured.

My present invention obviates this necessity by providing a small member which is readily applied and which, in effect, fills out, as it were, the broken portion of the lens, with the result that the lens can be restored to its mounting and the glasses made as serviceable as new. In fact glasses repaired according to my invention may be made even stronger and less liable to be broken than before.

Figure 1:
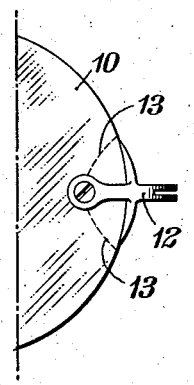
Figure 2:
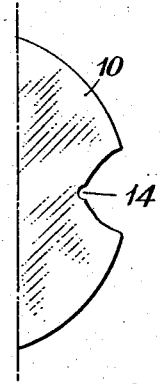
Figure 3:
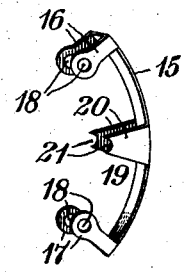
Figure 4:
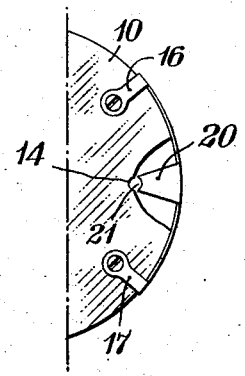
Figure 5:
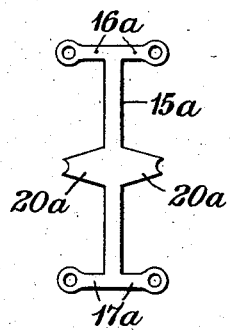
Figure 6:
Figure 7:
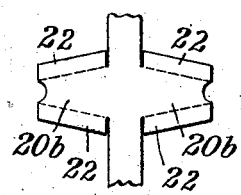
Figure 8:
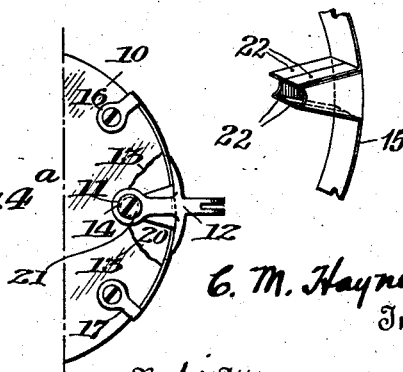

In the accompanying drawings I have illustrated a convenient and effective embodiment of the invention, in which drawings Figure 1 shows a portion of a lens and the post or strap by which the lens is connected to the bow or the nose piece, as the case may be. Fig. 2 shows the lens broken at the point where the breakage most often occurs. Fig. 3 is a perspective view of a cheap and effective form of my improved repairing device. Fig. 4 is a view showing the repairing device applied to a lens which has been broken as shown in Fig. 2. Fig. 4ª is a view showing a broken lens provided with the repair device and replaced in the original lens mounting. Fig. 5 is a plan view of the stamped-out blank from which the repair device can be made. Figs. 6, 7, and 8 are detail views illustrating modifications.

The lens 10, Fig. 1, is shown mounted in the ordinary way, by means of a screw 11 passing through a hole in the glass and through the forked post 12. Naturally the greatest stress to which the lens is subjected in use, particularly in taking off and replacing the glasses, is exerted at the post 12, and at this point the lens is materially weakened by the hole through which the screw 11 extends. This frequently results in breakage of a V-shaped piece out of the lens, more or less in conformity with the dotted lines 13. The lens thus broken appears as in Fig. 2, in which will be noted a rounded portion 14 of the hole originally occupied by the screw 11. It will be evident that if this is the only break the lens is practically if not wholly unimpaired for seeing purposes, but is without bearing for the fastening screw.

By means of my present invention it is possible for an optician to remount such a lens in the same mounting, thereby saving the expense of a new lens and avoiding the delay which would otherwise be entailed if the new lens had to be specially made or be ordered from a distance. The device provided for the purpose is clearly shown in Fig. 3, and comprises a strip 15 of sheet metal, preferably of considerable stiffness, curved in conformity to the original contour of the lens at the broken place. At each end the strip 15 is provided with arms 16, 17, adapted to embrace the lens at the edge and formed with perforations 18 to receive suitable fastening screws or rivets. Between its ends, preferably midway between, the strip has a lug 19, extending in the same general direction as the arms 16, 17, that is, radially inward with respect to the curvature of the strip. In the present instance this lug is formed by two prongs 20 extending from the edges of the curved strip, like the arms 16, 17, and terminating in curved recesses 21.

The device is applied to the broken lens in the manner shown in Fig. 4, with the arms 16, 17 embracing the edge-portion of the lens and firmly secured thereto by screws 22, 23, extending through holes drilled in the lens at the proper points, preferably so located as to stretch the strip lightly across the break or notch in the lens and hold the strip snugly against the edge of the lens. The lug 19 then extends into the notch to a point adjacent to the remaining portion 14 of the original hole in the lens, so that the curved recess 21 completes said hole, so to speak. The notch is now in effect filled, and the original post 12 can be replaced and fastened by means of the screw 11 passing through the hole 14—21, as clearly shown in Fig. 4ª, thereby putting the glasses again in condition for use. It will be seen that in effect the lug fills out the notch since it affords adequate bearing for the fastening screw, but I prefer not to have the lug itself span the entire notch as that would tend to make the device more obtrusive in appearance.

The device can be made cheaply by stamping out of sheet metal a blank of the form shown in Fig. 5, in which blank the vertical stem 15ª is afterward curved to form the strip 15, and the lateral members 16ª, 17ª at the ends of the stem and 20ª at the center are bent at right angles to the stem to form the arms 16, 17, and the lug-prongs 20, respectively. Ordinarily, with material of suitable stiffness, the prong method of forming the lug 19 will be found effective and satisfactory; but if a more rigid lug is desired it may be a solid piece of the form shown in perspective in Fig. 6, soldered or otherwise fastened to the curved strip or backing 15 at the proper point.

Another method of providing a substantially rigid lug in the device stamped out of sheet metal is shown in Figs. 7 and 8. In this case the prongs 20ᵇ are made wider and the edge portions 22 are then bent inwardly along the dotted lines, so that when the prongs are bent up to form the lug such edge portions will meet at their edges as shown in Fig. 8. This method provides a light, hollow lug which is for all practical purposes as rigid as the solid lug shown in Fig. 6. If a solid lug, such as is shown in Fig. 6, is to be used, the lateral members 20ª are not formed on the blank shown in Fig. 5. In such case the lug may be fastened to the stem or strip 15ª either before or after the blank is bent into the shape necessary to fit the lens. A convenient method is to fit and secure the strip to the lens and then secure the lug to the strip in the proper position. This method diminishes the amount of care needed in applying the device, as the position of the lug with respect to the break is not dependent upon the location of the holes for the screws which fasten the arms 16, 17 to the lens.

Practical use of the device has demonstrated its utility, the optician being able to effect in a few minutes and at small cost a repair which, by the old method, involving a new lens, might mean considerable expense and annoying delay. The device can be made of cheap or costly material, as may be desired, but in any case the cost of manufacture need be but a slight addition to the cost of the material.

It is to be understood that I do not consider the invention limited to the details herein specifically shown and described, but

What I claim as my invention is:

1. A device for repairing spectacle and eyeglass lenses, comprising a member adapted to extend into a notch-shaped break in the lens, and a support for said member, constructed to span the break and adapted for attachment to the lens.

2. A device for repairing spectacle and eyeglass lenses, comprising a member adapted to extend into a notch-shaped break in the lens, and a support for said member, comprising a curved strip adapted to span the break in the lens, and means for securing the strip to the lens.

3. A device for repairing spectacle and eyeglass lenses, comprising a member adapted to extend into a notch-shaped break in the lens and having a recess at its inner end, and means for securing said member to the lens.

4. A device for repairing spectacle and eyeglass lenses, comprising a strip adapted to span a notch-shaped break in the lens and having at its ends members adapted to engage the edge-portion of the lens on opposite sides of the break, and a member carried by the strip between its ends and adapted to extend into the notch-shaped break.

5. A device for repairing spectacle and eyeglass lenses, comprising a curved strip adapted to span a notch-shaped break in the lens and having at its ends arms adapted to embrace the edge-portion of the lens for securement thereto, and a lug carried by the strip between its ends to extend into the notch-shaped break.

6. The combination with a lens having a break at its edge, of a member filling more or less of said break to provide a bearing for the lens-mount, and means for securing said member to the lens.

7. A repairing device for a lens having a broken edge, comprising a member adapted to fill more or less of the break to provide a bearing for the lens-mount, and means for securing said member to the lens.

8. A repair device for the purpose described, comprising a sheet-metal member in the form of a curved strip provided with arms to engage the edge-portion of a lens for securement thereto, and a lug carried by the strip in position to extend into a break in the edge-portion of the lens.

9. A repair device for the purpose described, comprising a sheet-metal member in the form of a curved strip having at its ends arms to embrace the edge-portion of the lens, and a lug carried by the strip between its ends to extend into a break in the edge-portion of the lens so as to provide a bearing for the lens-mount.

10. A blank comprising a metal strip having laterally extending members at its ends adapted, when bent at an angle to said strip, to form arms for engagement with the edge-portion of a lens, said strip being provided between its ends with means adapted to provide a bearing for the mounting of a spectacle or eyeglass lens.

11. A blank comprising a metal strip having laterally extending arms at each end adapted, when bent at an angle to the strip, to embrace the edge-portion of a lens for securement thereto, said strip being provided between its ends with means adapted to provide a bearing for the mounting of the lens.

In testimony whereof I affix my signature in the presence of two subscribing witnesses.

CHARLES M. HAYNES.

Witnesses:
WILLY G. HYDE,
O. S. MOORE.

---

Copies of this patent may be obtained for five cents each, by addressing the "Commissioner of Patents, Washington, D. C."